United States Patent [19]

Hille et al.

[11] Patent Number: 4,567,971
[45] Date of Patent: Feb. 4, 1986

[54] HYDRAULIC CIRCUIT FOR ACTIVATING A CLUTCH AND A THROTTLE VALVE USED IN THE CIRCUIT

[75] Inventors: Hans-Jörg Hille, Otterstadt; Sabah Halabiya, Edingen, both of Fed. Rep. of Germany

[73] Assignee: Deere & Company, Moline, Ill.

[21] Appl. No.: 462,280

[22] Filed: Jan. 31, 1983

[30] Foreign Application Priority Data

Jun. 23, 1982 [EP] European Pat. Off. ........ 82303288.3

[51] Int. Cl.⁴ ..................... F16D 25/14; F16D 67/04
[52] U.S. Cl. .................................. 192/12 C; 91/468; 192/18 A; 192/109 F
[58] Field of Search ................ 192/12 C, 18 A, 85 A, 192/52, 109 F; 91/468; 137/505.26

[56] References Cited

U.S. PATENT DOCUMENTS

| | | | |
|---|---|---|---|
| 2,722,296 | 11/1955 | Stoeckicht | 192/0.075 |
| 2,756,850 | 7/1956 | Schenkelberger | 192/109 F |
| 2,939,557 | 6/1960 | Dabich et al. | 192/109 F |
| 3,067,693 | 12/1962 | Lambeck | 91/468 X |
| 3,306,408 | 2/1967 | Kahle | 192/109 F X |
| 3,669,229 | 6/1972 | Ronayne et al. | 192/12 C |
| 3,674,121 | 7/1972 | Copeland | 91/468 X |
| 3,752,281 | 8/1973 | Arnold | 192/109 F X |
| 3,818,776 | 6/1974 | Prenzel et al. | 192/109 F X |
| 3,905,459 | 9/1975 | Liebich | 192/109 F |
| 3,946,760 | 3/1976 | Murakami et al. | 91/468 X |
| 3,991,865 | 11/1976 | Komatsu | 192/109 F |
| 3,999,462 | 12/1976 | Chamberlain | 91/468 X |
| 4,000,795 | 1/1977 | Patton | 192/109 F |
| 4,046,162 | 9/1977 | Rodeghiero | 192/106 F X |
| 4,257,505 | 3/1981 | Stodt | 192/18 A |
| 4,265,346 | 5/1981 | Emmadi | 192/109 F X |
| 4,296,649 | 10/1981 | Marquart | 192/12 C |
| 4,411,345 | 10/1983 | Haight et al. | 192/12 C |
| 4,465,168 | 8/1984 | Sato | 192/109 F X |

FOREIGN PATENT DOCUMENTS

| | | |
|---|---|---|
| 2935702 | 3/1981 | Fed. Rep. of Germany .... 192/12 C |
| 1191429 | 5/1970 | United Kingdom . |
| 1235273 | 6/1971 | United Kingdom . |
| 1315721 | 5/1973 | United Kingdom . |

Primary Examiner—Rodney H. Bonck

[57] ABSTRACT

A hydraulic circuit is disclosed for activating a clutch as well as a throttle valve which is used in the circuit. The hydraulic circuit includes a hydraulic actuator which is connected to a source of pressurized fluid to alternatively activate the clutch. Connected between the source of pressurized fluid in the actuator is a control valve and a pressure-responsive throttle valve. The control valve is basically an on/off valve which controls the flow of fluid to the clutch actuator or from the clutch actuator to a reservoir. The throttle valve, on the other hand, is arranged in series with the control valve and is responsive to fluid pressure on its downstream side to cause increased throttling of the fluid as the fluid pressure to the actuator increases. Such a circuit is beneficial in preventing the clutch from snatching as it is being engaged.

4 Claims, 4 Drawing Figures

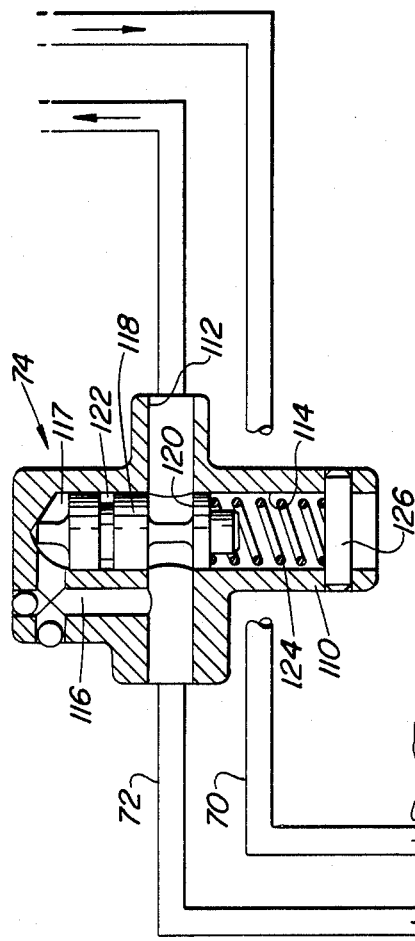
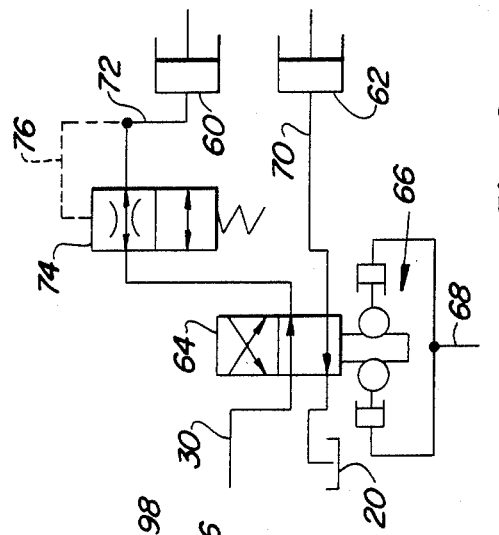
Fig. 2
Fig. 3

HYDRAULIC CIRCUIT FOR ACTIVATING A CLUTCH AND A THROTTLE VALVE USED IN THE CIRCUIT

FIELD OF THE INVENTION

The present invention relates to a hydraulic circuit for activating a clutch or a brake mechanism and a pressure-responsive variable throttle valve used in the circuit.

BACKGROUND OF THE INVENTION

Hydraulic circuits are commonly employed for activating clutch and brake mechanisms on vehicles especially agricultural and industrial tractors. A specific function for such a hydraulic circuit is in the operation of a power take-off shaft located on the rear of agricultural tractors. Normally, a clutch is employed having multiple drive plates and driven plates. The plates are axially engaged by an annular piston which is operated by hydraulic pressure from a low pressure hydraulic source. In tractors, the hydraulic source is commonly a gear pump which supplies a plurality of low pressure functions, some directly and others, including the clutch actuator, by way of a pressure regulating valve. This pump also supplies the transmission lubrication system. As is common, the pump has to be of substantial capacity to be sure of supplying all functions without loss of adequate pressure. In addition, the pump has to be capable of supplying fluid to the hydraulic functions at a substantial rate in order to fill the hydraulic lines rapidly and in order to take up the free movement in the annular piston in the actuator. Free movement arises from normal tolerances and also because the plates of the clutch are spring-biased to separate completely each time the clutch is disengaged. Such separation ensures adequate cooling of the plates by means of ventilation. If the low pressure pump does not supply sufficient capacity, there is a noticeable and unacceptable delay in engaging the clutch.

Once the plates of the clutch have come into initial engagement, they require only a very small further movement of the annular piston in order to build up full engaging pressure. Therefore, a pressure rise occurs very rapidly. Consequently, the clutch tends to snatch into rapid engagement thereby producing torque shocks which may be potentially dangerous and damaging to the power take-off shaft and/or to the driven implement in the case of a tractor driven PTO.

In order to prevent such snatching of the clutch, attempts have been made to insert an automatic modulating valve upstream of the annular piston so as to control the buildup of pressure in a smooth manner. However, the tolerances of such valves are very critical and experience has shown that it is difficult to ensure reliable operation, especially as clutch wear takes place over the life of the vehicle. Now a hydraulic circuit has been invented which uses a pressure-responsive throttle valve to overcome the snatching problem present in hydraulic actuators.

SUMMARY OF THE INVENTION

Briefly, this invention relates to a hydraulic circuit for activating a clutch and a throttle valve used in the circuit. The hydraulic circuit includes an actuator, such as a hydraulic piston, which causes engagement of clutch plates positioned within the clutch. A source of pressurized fluid is connected to the actuator by a conduit having both a control valve and a pressure-responsive throttle valve positioned across it. The control valve regulates fluid flow from the pressurized source to the clutch actuator and at times away from the clutch actuator to a sump. The pressure-responsive throttle valve is arranged in series with the control valve and is responsive to fluid pressure on its downstream side to cause increased throttling of the fluid as the fluid pressure impinging on the actuator increases. The use of this hydraulic circuit on a vehicle eliminates snatching of the clutch as it is being engaged.

The general object of this invention is to provide a hydraulic circuit for activating a clutch and a throttle valve used in the hydraulic circuit. A more specific object of this invention is to provide a hydraulic circuit which prevents a clutch from snatching as the plates are engaged.

Another object of this invention is to provide a hydraulic circuit for a clutch which is simple and reliable.

A further object of this invention is to provide a hydraulic circuit for a clutch which uses a throttle valve having an axially movable spool valve therein.

Still further, an object of this invention is to provide a hydraulic circuit for preventing a clutch from snatching as it is engaged wherein a throttle valve is used which does not require close tolerances and critical dimensions.

Other objects and advantages of the present invention will become more apparent to those skilled in the art in view of the following description and the accompanying drawings.

BRIEF DESCRIPTION OF THE DRAWINGS

FIG. 2 is a partial view of the hydraulic circuit shown in FIG. 1 with the clutch engaged.

FIG. 3 is a clutch and brake arrangement connected to a PTO shaft and showing the spool of the throttle valve positioned in a first position wherein flow to a disengaged clutch is unrestricted.

DETAILED DESCRIPTION OF THE PREFERRED EMBODIMENT

Figure 1:
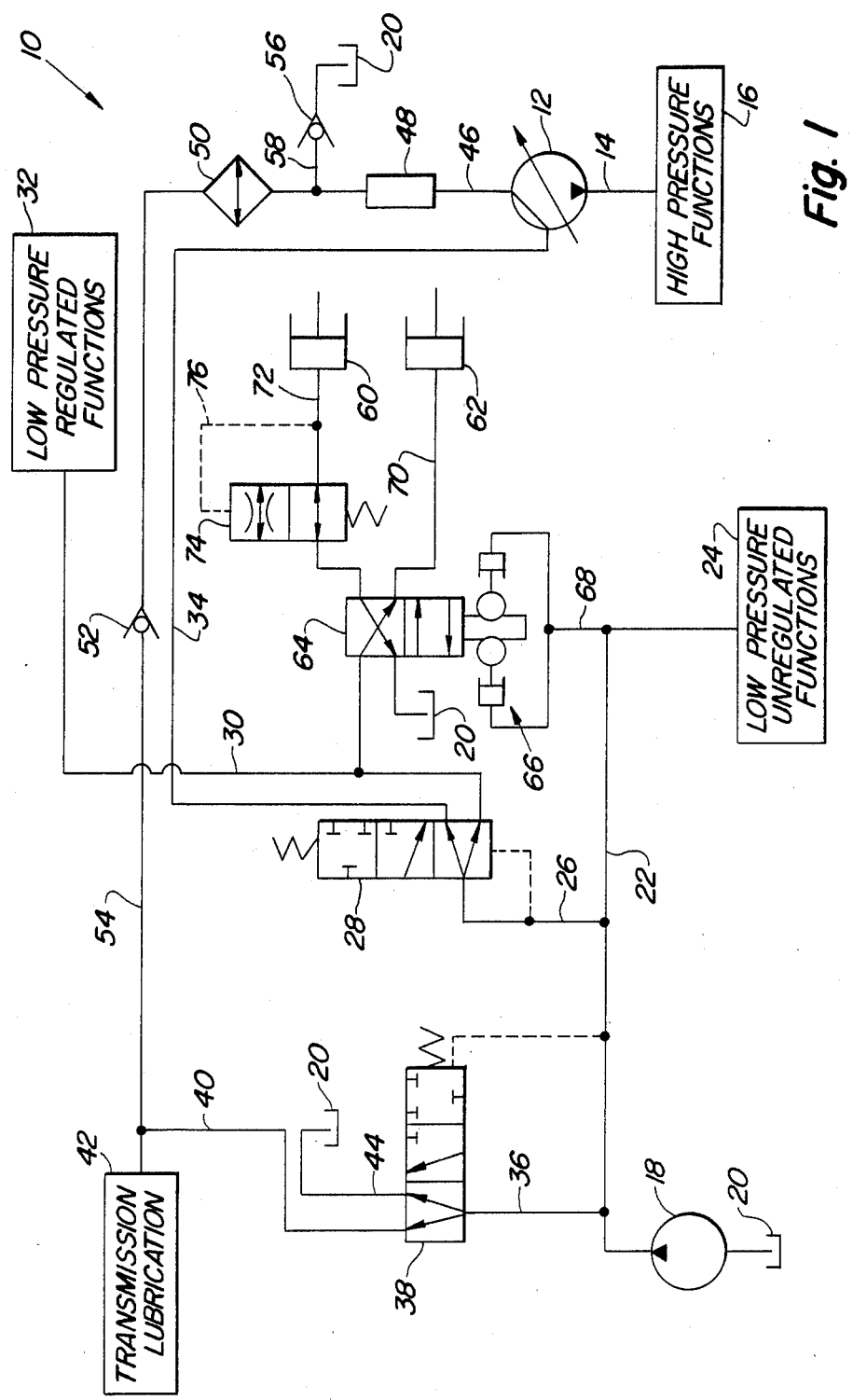
FIG. 1 is a hydraulic circuit diagram for a tractor with a PTO shaft and embodying the invention, the circuit being shown with the clutch disengaged.

Referring to FIG. 1, a hydraulic circuit 10 is shown specifically adapted for a vehicle having a power take-off shaft. The hydraulic circuit 10 includes a high pressure pump 12 which supplies fluid through a conduit 14 to one or more high pressure functions 16 for example to the steering mechanism. The hydraulic circuit 10 also includes a low pressure pump 18, for example a gear pump, which supplies low pressure fluid from a supply reservoir 20 via a conduit 22 to one or more unregulated low pressure functions 24. An example of an unregulated low pressure function is the cooling oil for the vehicle. In addition, the low pressure pump 18 supplies fluid through a conduit 26 to a pressure regulating valve 28. From the pressure regulating valve 28, the flow is either directed via a conduit 30 to one or more regulated flow pressure functions 32 or via a conduit 34 to the high pressure pump 12. The fluid from the low pressure pump 18 can also be directed through a conduit 36 to a second pressure regulating valve 38 which is selectively connected by a conduit 40 to a transmission lubrication function 42 or by a conduit 44 back to the reservoir 20.

It should also be noted that the fluid in the conduit 34 which is routed to the high pressure pump 12 but which is not used, is permitted to pass via a conduit 46 into a tank 48. From the tank 48 the fluid passes through an oil cooler 50, a one-way check valve 52 and through a conduit 54 to the transmission lubrication function 42. When the fluid in the conduit 34 is insufficient to supply the needs of the high pressure pump 12, additional fluid can be supplied from the reservoir 20 via a second one-way check valve 56 and a conduit 58.

In the hydraulic circuit 10, one of the regulated low pressure functions 32 includes a power take-off clutch actuator 60, such as a hydraulic piston, and a power take-off brake actuator 62 which can likewise be a hydraulic piston. The actuators 60 and 62 are controlled by a four-way, two position, on-off PTO control valve 64. Preferably, the PTO control valve 64 is manually operated and is provided with a known pressure actuated detent mechanism 66. The detent mechanism 66, which is connected by line 68 to the conduit 22, ensures that the PTO control valve 64 automatically assumes the position illustrated in FIG. 1 when the pressure in the conduit 22 falls below a predetermined value.

In the first position, as shown in FIG. 1, the PTO control valve 64 connects the low pressure line 30 to the brake actuator 62 via a conduit 70 and vents the clutch actuator 60 to the reservoir 20 via a conduit 72. Positioned between the PTO control valve 64 and the clutch actuator 60 is a pressure-responsive, throttle valve 74. The throttle valve is preferably a two-way, two position valve which is movable between first and second positions. In the first position, as illustrated in FIG. 1, a substantially unimpeded flow path is provided between the PTO control valve 64 and the clutch actuator 60 while in the second position a restricted passageway is provided which throttles the flow to the clutch actuator 60.

When the PTO control valve 64 is moved to the position shown in FIG. 2, fluid in the low pressure line 30 is directed to the clutch actuator 60 via the throttle valve 74 while fluid from the brake actuator 62 is vented to the reservoir 20. When the PTO control valve 64 is initially moved from its first to its second position, there is a rapid flow of hydraulic fluid through the conduit 72 without a significant buildup of pressure and the throttle valve 74 remains in its first position. In this position, fluid is permitted to rapidly flow to the clutch actuator 60 and move the actuator 60 to a point wherein the clutch plates are just about ready to engage. Thereafter, the pressure builds up and the throttle valve 74 responds to the pressure on its downstream side, via the pressure sensing passage 76, to move toward the second position wherein fluid flows through the throttle valve is appreciably restricted. Accordingly, further buildup of pressure on said clutch actuator 60 is limited to an acceptable rate such that the clutch engages smoothly.

Figure 4:
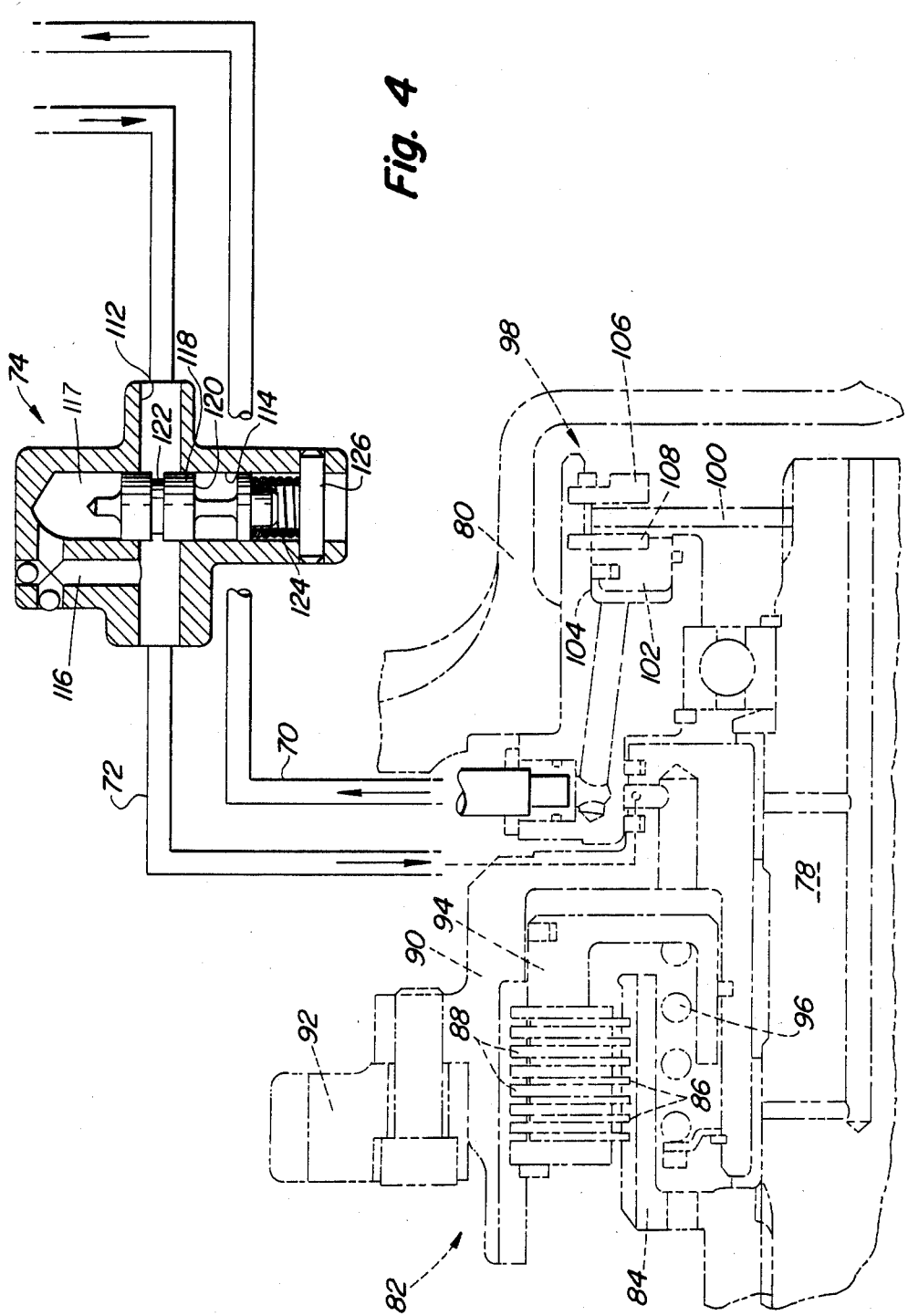
FIG. 4 is a sectional view similar to FIG. 3 showing the spool of the throttle valve being positioned in a second position to restrict flow to an engaging clutch.

Referring now to FIGS. 3 and 4, one constructional form of a power take-off shaft 78 is shown journaled into a tractor housing 80. A clutch 82 is arranged relative to the PTO shaft 78 in a conventional manner. The clutch 82 includes a clutch drum 84, which is keyed onto the PTO shaft 78, and a plurality of driven plates 86. The driven plates 86 are splined onto the clutch drum 84 in such a manner that they can rotate with the PTO shaft 78 as well as being capable of axially shifting thereon. The driven plates 86 alternate with drive plates 88 which are splined to a clutch carrier 90. The clutch carrier 90 is rotated by the engine of the tractor via a ring gear 92. The clutch actuator 60 of FIGS. 1 and 2 can be an annular piston 94 which is slidably disposed within a cavity 95 formed at one end of the plates 86 and 88. The piston 94 is biased to a disengaged position as shown in FIG. 3, by a helical compression spring 96.

Also positioned within the tractor housing 80 is a brake 98 which contains a brake disk 100 which is splined onto the PTO shaft 78. The brake actuator 62, shown in FIGS. 1 and 2, can be an annular piston 102 which is slideably disposed within a cavity 104 formed within the housing 80. The brake piston 102 is similar to the clutch piston 94 in that it is hydraulically actuated such that when pressure is applied to one end of it, it causes the brake disk 100 to be clamped between a pair of brake pads 106 and 108.

As denoted in FIGS. 1 and 2, the conduit 70 directs fluid to and from the brake piston 102 while the conduit 72 directs fluid to and from the clutch piston 94. Positioned across the conduit 72 is the throttle valve 74. The throttle valve 74 includes a valve body 110 having a large through bore 112 formed therein through which hydraulic fluid flows. The through bore 112 is intersected by a transverse bore 114 and also has a flow passage 116 positioned between the transverse bore 114 and the clutch piston 94 which intersects with a chamber 117 formed at a closed end of the transverse bore 114. Positioned within the transverse bore 114 is a movable spool valve 118 which contains a pair of spaced apart annular grooves 120 and 122 formed in the periphery thereof. Preferably, the groove 120 is larger than the groove 122 and more preferably, the groove 120 is at least three times as large as the groove 122. The spool valve 118 is biased to a first position within the transverse bore 114 by a helical compression spring 124 which is retained within the valve body 110 by a pin 126. In the first position, the larger groove 120 is aligned with the through bore 112 thereby providing substantially unimpeded fluid flow therethrough. With the spool valve 118 in its first position, pressurized fluid is directed to the clutch piston 94 such that the clutch plates 86 and 88 will start to engage. As the clutch piston 94 engages the plates 86 and 88, the pressure acting on the clutch piston 94 will increase and this pressure will be conveyed through the flow passage 116 to the chamber 117. As pressure within the chamber 117 increases to a value which is greater than the force of the spring 124, the spool valve 118 will start to move downward to its second position, as shown in FIG. 4. In this down position, the smaller annular groove 122 is aligned with the through bore 112 and a significant throttling action occurs whereby the fluid flow through the throttling valve 74 is substantially restricted.

The spool-type throttle valve 74 of this invention is much more desirable than an automatic modulating valve because it does not require the close tolerances and critical dimensions as the modulating valve would require. It also has the advantages of providing reliable operation irregardless of the wear which occurs on the clutch plates 86 and 88 over a period of time.

It should be noted that FIG. 3 corresponds to FIG. 1 wherein fluid pressure conveyed through the conduit 70 is directed to the brake piston 102 thereby causing the brake 98 to be applied which arrests the rotation of the PTO shaft 78. Simultaneously, the conduit 72 permits fluid from the clutch piston 94 to be vented through the unobstructed through bore 112 of the throttle valve 74 back to the reservoir 20. In the situation illustrated in FIG. 4, which corresponds to the circuit shown in FIG. 2, fluid pressure within the conduit 72 is directed to the right side of the clutch piston 94 thereby causing the clutch plates 86 and 88 to engage. With the clutch 82 engaged, the PTO shaft 78 is driven by the ring gear 92. Simultaneously, the brake piston 102 is vented to the reservoir 20 by way of the conduit 70.

While this invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A hydraulic circuit for activating a clutch, said circuit comprising:
    (a) actuator means for activating said clutch;
    (b) a source of pressurized fluid;
    (c) a conduit connecting said source of pressurized fluid to said actuator means;
    (d) a control valve positioned across said conduit for controlling the flow of pressurized fluid therethrough; and
    (e) a pressure-responsive throttle valve positioned across said conduit and arranged in series with said control valve, said throttle valve having a fluid flow path across a spool valve located therein, said spool valve having a first passageway permitting relatively unrestricted fluid flow across said spool valve and a second passageway restricting fluid flow across said spool valve relative to said first position wherein a shifting from said first to said second position occurs solely in response to a predetermined fluid pressure on the downstream side of said spool valve with said flow path being maintained across said second passageway as long as fluid pressure downstream of said spool valve equals or exceeds said predetermined fluid pressure.

2. The hydraulic circuit of claim 1 wherein said control valve is an on/off valve.

3. The hydraulic circuit of claim 2 wherein said control valve is a four-way, two position valve which is movable between a first position in which said source of pressurized fluid is connected to said actuator means via said throttle valve and a second position in which said source of pressurized fluid is directly connected to a hydraulic brake which brakes a power take-off shaft.

4. A hydraulic circuit for activating both a clutch and a brake associated with a power take-off shaft, said clutch having a plurality of interacting drive plates and driven plates, said hydraulic circuit comprising:
    (a) a hydraulic piston positioned in said clutch for frictionally causing said drive plates to contact said driven plates;
    (b) a source of pressurized fluid;
    (c) a first conduit connecting said source of pressurized fluid to said hydraulic piston;
    (d) a second conduit connecting said brake to a fluid reservoir;
    (e) a four-way, two position control valve positioned across both said first and second conduits, said control valve being movable between a first position wherein pressurized fluid is directed both from said source to said hydraulic piston and from said brake to said reservoir, and a second position wherein pressurized fluid is directed both from said source to said brake and from said hydraulic piston to said reservoir; and
    (f) a two-way two position throttle valve positioned across said first conduit between said control valve and said hydraulic piston, said throttle valve including a valve body having a through bore formed therein which is intersected by a transverse bore, said through bore being connected at one end to said control valve and at an opposite end to said hydraulic piston, and a flow passage connecting said through bore to one end of said transverse bore, a spool valve positioned in said transverse bore having a pair of spaced apart grooves formed in the periphery thereof, one of said grooves being larger than said other groove, and a spring positioned in said transverse bore and acting on one end of said spool valve for urging said spool valve to a first position wherein said larger groove is aligned with said through bore to permit unrestricted fluid flow from said control valve to said hydraulic piston, and when a rise in pressure occurs in said through bore, it is conveyed through said flow passage to an end of said spool valve opposite said spring to force said spool valve against said spring thereby aligning said smaller groove with said through bore to throttle fluid flow from said control valve to said hydraulic piston.

* * * * *